(12) United States Patent  
Furutake

(10) Patent No.: US 11,190,672 B2  
(45) Date of Patent: Nov. 30, 2021

(54) LENS MODULE AND VEHICULAR IMAGING DEVICE

(71) Applicant: DENSO CORPORATION, Kariya (JP)

(72) Inventor: Yasuki Furutake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/715,244

(22) Filed: Dec. 16, 2019

(65) Prior Publication Data

US 2020/0195823 A1    Jun. 18, 2020

(30) Foreign Application Priority Data

Dec. 18, 2018  (JP) .............................. JP2018-236478

(51) Int. Cl.
| | |
|---|---|
| *H04N 5/225* | (2006.01) |
| *G03B 17/04* | (2021.01) |
| *G02B 7/02* | (2021.01) |
| *B60R 11/04* | (2006.01) |

(52) U.S. Cl.
CPC ........... *H04N 5/2257* (2013.01); *B60R 11/04* (2013.01); *G02B 7/02* (2013.01); *G03B 17/04* (2013.01); *H04N 5/2254* (2013.01)

(58) Field of Classification Search
CPC ............ H04N 5/2257; G03B 2217/002; G02B 7/021; B60R 11/04
See application file for complete search history.

(56) References Cited

U.S. PATENT DOCUMENTS

| | | | | |
|---|---|---|---|---|
| 2004/0223074 | A1* | 11/2004 | Takada | G02B 9/62 |
| | | | | 348/360 |
| 2011/0085070 | A1* | 4/2011 | Kang | G02B 7/022 |
| | | | | 348/340 |
| 2016/0349475 | A1* | 12/2016 | Horiuchi | G02B 9/34 |
| 2018/0270404 | A1* | 9/2018 | Ishida | H04N 9/04557 |

FOREIGN PATENT DOCUMENTS

| | | |
|---|---|---|
| JP | S59-031913 A | 2/1984 |
| JP | 2010-054866 A | 3/2010 |
| JP | 2010054866 A * | 3/2010 |
| WO | WO-2008093752 A1 * | 8/2008 ......... G02B 13/0035 |

OTHER PUBLICATIONS

"Zoom Lens Systems With Aspherical Plastic Lens"—Takesuke Maruyama, Masao Takagi, Yoshihiko Noro, Masami Masuda, Hiroshi Ohtsu; IEEE Transactions on Consumer Electronics, vol. CE-33, No. 3, Aug. 1987 (Year: 1987).*

* cited by examiner

*Primary Examiner* — Mainul Hasan
(74) *Attorney, Agent, or Firm* — Maschoff Brennan

(57) ABSTRACT

In a lens module, a first lens barrel has opposing first and second ends and an optical axis. A glass lens is disposed in the first lens barrel, and a resin lens is disposed in the first lens barrel and is arranged to be closer to the second end than the glass lens is. A second lens barrel is disposed in the first lens barrel to surround the at least one resin lens. A holding mechanism applies pressing force to the at least one glass lens and the second lens barrel in a direction of the optical axis to perform pressure holding of the at least one glass lens and the second lens barrel in a direction of the optical axis. The holding mechanism holds the at least one resin lens while preventing the pressing force from being directly applied to the at least one resin lens.

15 Claims, 8 Drawing Sheets

LENS MODULE AND VEHICULAR IMAGING DEVICE

CROSS-REFERENCE TO RELATED APPLICATION

This application is based on and claims the benefit of priority from earlier Japanese Patent Application No. 2018-236478 filed on Dec. 18, 2018, the entire disclosure of which is incorporated herein by reference.

TECHNICAL FIELD

The present disclosure relates to lens modules and vehicular imaging devices each including such a lens module.

BACKGROUND

Lens modules, which include a lens barrel and a plurality of lenses disposed in the lens barrel, are used for various imaging devices, such as cameras, in particular, vehicular imaging devices.

SUMMARY

According to a first exemplary aspect of the present disclosure, there is provided a lens module. The lens module includes a holding mechanism. The holding mechanism is configured to apply pressing force to at least one glass lens and a second lens barrel to perform pressure holding of the at least one glass lens and the second lens barrel in a direction of an optical axis of a first lens barrel. The holding mechanism is also configured to hold the at least one resin lens while preventing the pressing force from being directly applied to the at least one resin lens.

According to a second exemplary aspect of the present disclosure, there is provided a lens module. The lens module includes a holding mechanism. The holding mechanism includes a first press member configured to press a second lens barrel in a direction of an optical axis of a first lens barrel to press the at least one glass lens via the second lens barrel, thus performing pressure holding of the at least one glass lens and the second lens barrel. The holding mechanism includes a second press member configured to press the at least one resin lens in the second lens barrel parallel to the optical axis, thus performing pressure holding of the at least one resin lens.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT VIEW POINT

Figure 1:
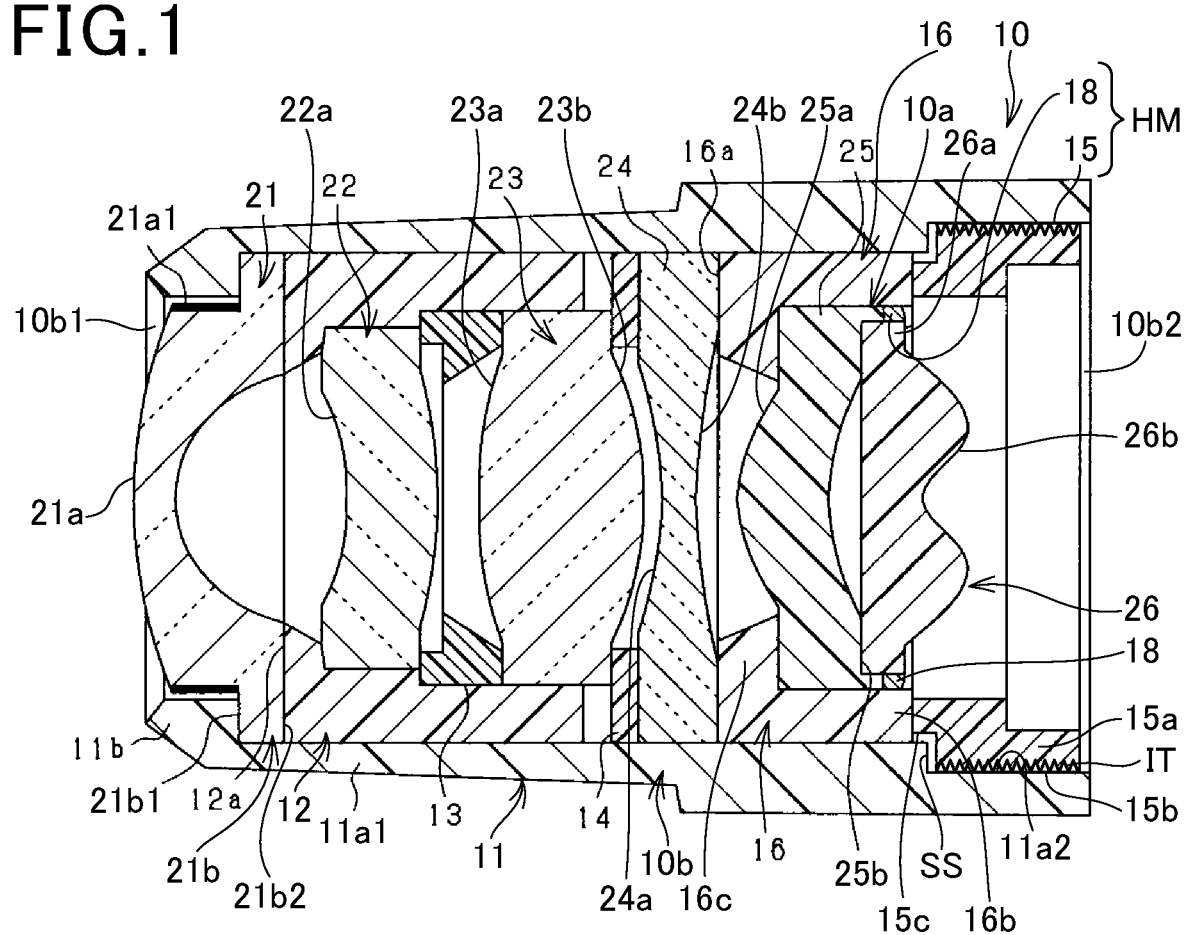
FIG. 1 is a longitudinal cross-sectional view of a lens module according to the first embodiment of the present disclosure.

Lens modules, which include a lens barrel and a plurality of lenses disposed in the lens barrel, are used for various imaging devices, such as cameras, in particular, vehicular imaging devices. For avoiding, for example, misalignment of optical axes of the lenses, it is important to hold the lenses to be in proper alignment in the lens barrel. Various technologies have been proposed for holding a plurality of lenses to be in proper alignment in a lens barrel, one of which is disclosed in Japanese Patent Application Publication No. 2010-54866, which will be referred to as a published patent document.

The published patent document discloses a lens module including a plurality of lenses disposed in a lens barrel; each of the lenses has an optical surface. Each of the lenses includes a projection or a recess formed at an outer periphery of the optically working surface thereof; the recess is shaped to be in conformity with the projection. At least one pair of the lenses adjacent to each other, one of which has the projection and the other of which has the recess, are arranged such that the projection of one of the adjacent lenses is fitted in the recess of the other of the adjacent lenses.

f such a lens module disclosed in the published patent document is installed in a vehicle, the lens module is subjected to various severe environments with wide temperature changes. Such a lens module disclosed in the published patent document may include different types of lenses, such as glass lenses and resin lenses, disposed in the lens barrel. For holding the glass lenses in the lens barrel without wobbling or rattling, it is necessary to strongly hold the glass lenses in an axial direction of the lens barrel.

This strong holding of the glass lenses may similarly result in strong holding of the resin lenses. If such a lens module including glass lenses and resin lenses is installed in a vehicle while these glass and resin lenses are strongly held in the axial direction of the lens barrel, the strong holding of the resin lenses under a high-temperature environment may cause at least one of the resin lenses to creep or become deformed. This may result in at least one of the resin lenses to wobble.

In view of the circumstances set forth above, an aspect of the present disclosure seeks to provide lens modules and imaging devices, each of which is capable of properly holding a glass lens and a resin lens while restricting wobbling or rattling of the glass and resin lenses.

According to a first exemplary aspect of the present disclosure, there is provided a lens module. The lens module includes a first lens barrel having opposing first and second ends and an optical axis, at least one glass lens disposed in the first lens barrel, and at least one resin lens disposed in the first lens barrel and arranged to be closer to the second end than the glass lens is. The lens module includes a second lens barrel disposed in the first lens barrel to surround the at least one resin lens and a holding mechanism. The holding mechanism is configured to apply pressing force to the at least one glass lens and the second lens barrel to perform pressure holding of the at least one glass lens and the second lens barrel in a direction of the optical axis, and hold the at least one resin lens while preventing the pressing force from being directly applied to the at least one resin lens.

The first exemplary aspect of the present disclosure is configured to perform pressure holding of the at least one glass lens and the second lens barrel, and hold the at least one resin lens while preventing the pressing force from being directly applied to the at least one resin lens.

This configuration prevents the pressing force for the at least one glass lens from being directly applied to the at least one resin lens while performing the pressure holding of the at least one glass lens, making it possible to prevent the at least one glass lens and the at least one lens from creeping or being deformed.

According to a second exemplary aspect of the present disclosure, there is provided a lens module. The lens module includes a first lens barrel having opposing first and second ends and an optical axis, at least one glass lens disposed in the first lens barrel, and at least one resin lens disposed in the first lens barrel and arranged to be closer to the second end than the at least one glass lens is. The lens module includes a second lens barrel disposed in the first lens barrel to surround the at least one resin lens and a holding mechanism. The holding mechanism includes a first press member configured to press the second lens barrel in a direction of the optical axis to press the at least one glass lens via the second lens barrel, thus performing pressure holding of the at least one glass lens and the second lens barrel. The holding mechanism includes a second press member configured to press the at least one resin lens in the second lens barrel parallel to the optical axis, thus performing pressure holding of the at least one resin lens.

The second exemplary aspect of the present disclosure is configured to press the second lens barrel and the at least one glass lens parallel to the optical axis using the first press member, and press the at least one resin lens in the second lens barrel parallel to the optical axis using the second press member different from the first press member.

This configuration therefore makes it possible to adjust the pressing force of the first press member suitable for the at least one glass lens, and pressing force of the second press member suitable for the at least one resin lens, thus preventing at least one glass lens and the at least one lens from creeping or being deformed.

EMBODIMENT

The following describes embodiments of the present disclosure with reference to the accompanying drawings. In the embodiments, like parts between the embodiments, to which like reference characters are assigned, are omitted or simplified to avoid redundant description.

First Embodiment

The following describes a vehicular imaging device 100 according to the first embodiment with reference to FIGS. 1 to 4 and 11.

Figure 11:
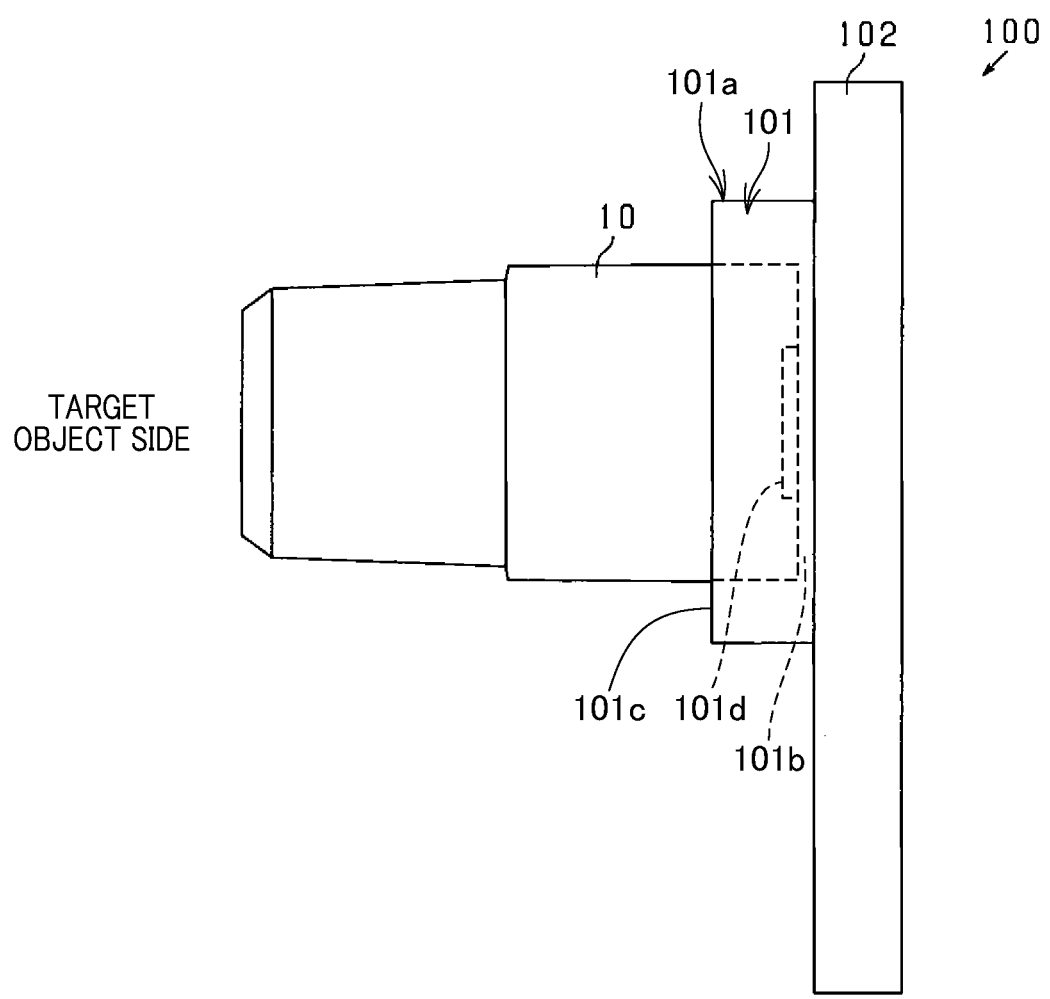
FIG. 11 is a side view of a vehicular imaging device according to each of the first and second embodiments.

Referring to FIG. 11, the vehicular imaging device 100 installed in a vehicle includes a lens module 10, an imaging unit 101, and a mount member 102. Note that the vehicular imaging device 100 has a predetermined field of view. In FIG. 11, the left direction corresponds to the front direction of the vehicle, and the right direction corresponds to the rear direction of the vehicle.

The mount member 102 for example has a rectangular plate-like shape having opposing first and second major surfaces, and is mounted to a vehicular body of the vehicle such that the vehicular imaging device 100 is arranged close to the center of the upper portion of the inner surface of a front windshield, and the first major surface of the mount member 102 is directed to the front of the vehicle.

The imaging unit 101 includes, for example, a housing 101a having a substantially tubular shape, i.e. a hollow cylindrical shape, with a substantially circular bottom wall 101b and a substantially tubular sidewall 101c. The housing 101a is mounted at an outer surface of its bottom wall 101b on the first major surface of the mount member 102.

The imaging unit 101 includes a color image sensor 101d, such as a known charge-coupled device (CCD) image sensor or a complementary metal-oxide-semiconductor (CMOS) image sensor. The color image sensor is mounted on an inner surface of the bottom wall 101b, and is comprised of a plurality of light receiving elements, which respectively correspond to a plurality of pixels, two-dimensionally arranged in both vertical and horizontal directions corresponding to the respective height direction and width direction of the vehicle. The two-dimensionally arranged pixels constitute a light receiving surface of the imaging unit 101.

The lens module 10 is coupled to the tubular side wall of the housing 101c such that the inner chamber of the lens module 10 communicates with the inner space of the housing 101a.

The lens module 10 includes a lens unit 10a and a lens-barrel assembly 10b for holding the lens unit 10a. The lens-barrel assembly 10b has a substantially hollow cylindrical or tubular outline, and has opposing first and second circular opening end walls 10b1 and 10b2; the first circular opening end wall 10b1 is arranged to be closer to the front end of the vehicle than to the rear end of the vehicle, and the second circular opening end wall 10b2 is arranged to be closer to the rear end of the vehicle than to the front end of the vehicle.

The lens module 10 of the vehicular imaging device 100 has a field of view directed to the front of the vehicle via the first circular opening end wall 10b1.

The vehicular imaging device 100 is configured such that the lens module 10 focuses light incident from, for example, the front of the vehicle on the light receiving surface of the color image sensor 101d as an image including one or more target object to be captured. The color image sensor 101d receives light focused on the light receiving surface thereof, so that each of the two-dimensionally arranged light-sensitive elements (pixels) receives a corresponding light component.

Then, the color image sensor 101d converts, using each of the light receiving elements, the intensity or luminance level for each of red, green, and blue (RGB) of a corresponding received light component into an analog pixel value or an analog pixel signal that is proportional to the luminance level of the corresponding received light component; the analog pixel values of all the pixels, i.e. light receiving elements, constitute an analog frame image.

The imaging unit 101 or an unillustrated ECU is configured to convert the analog pixel signals (analog pixel values) of the analog frame image into digital pixel signals (digital pixel values) based on a predetermined bit width, i.e. the number of bits, thus obtaining a digital frame image comprised of two-dimensionally arranged pixels, each of which has a corresponding digital pixel value. The imaging unit 101 is configured to, for example, cyclically obtain the digital frame image, and the digital frame images can be used by the ECU for obtaining, for example, lane marker information indicative of lane markers of a road on which the vehicle is travelling and/or environment information indicative of information around the vehicle.

FIG. 1 schematically illustrates a longitudinal cross-sectional view of the lens module 10.

Specifically, the lens unit 10a includes first to fourth glass lenses 21 to 24 each made of glass, and first and second resin lenses 25 and 26 each made of, for example, a resin material.

Each of the lenses 21 to 26 has an optical axis. Each of the lenses 21 to 26 has opposing first and second major surfaces, and each of the first and second major surfaces is comprised of a spherical or aspherical effective aperture region, i.e. optically effective region, that has one or more optical effects, and a non-optical outer periphery located to surround the effective aperture region. Each of the first and second major surfaces can be comprised of no non-optical outer peripheries, so that each of the first and second major surfaces can be comprised of only an effective aperture region.

The lens barrel assembly 10b is comprised of a substantially hollow cylindrical or tubular first lens barrel 11 in which the lenses 21 to 26 are disposed in proper alignment in this order from the front to the rear of the first lens barrel 11 in this order. That is, the optical axes of the respective lenses 21 to 26 installed in the first lens barrel 11 are aligned with each other.

The first lens barrel 11 is made of, for example, a relatively hard resin material, and has a substantially tubular or hollow cylindrical shape. The first lens barrel 11 is comprised of a first barrel portion 11a1 and a second barrel portion 11a2 located to be closer to the rear end of the vehicle than the first barrel portion 11a1 thereto.

The first barrel portion 11a1 has formed therein a cylindrical inner chamber, in which the lenses 21 to 26 are installed, having a constant inner diameter D1. The first barrel portion 11a1 has opposing front and rear ends, each of which has an opening. The first end of the first barrel portion 1 corresponds to the circular front end of the lens barrel 10. The front end of the first barrel portion 11a1 corresponds to the first circular opening end wall 10b1 of the lens barrel 10, and has a center aligned with a center axis, i.e. an optical axis, of the first barrel portion 11a1, i.e. the lens barrel 10.

The second barrel portion 11a2 serves as a diameter expansion portion to have an inner diameter D2 longer than the inner diameter D1. The second barrel portion 11a2 is continuously arranged from the second end of the first barrel portion 11a1 to extend toward the rear end of the vehicle to be in alignment with each other. Specifically, the first lens barrel 11 includes an annular shoulder surface SS connecting between the rear end of an inner surface of the first barrel portion 11a1 and the front end of an inner surface of the second barrel portion 11a2. The rear end of the second barrel portion 11a2 corresponds to the second circular opening end wall 10b2 of the lens barrel 10.

The first barrel portion 11 has formed an annular latch member 11b at the first end thereof; the latch member 11b projects inwardly from the inner surface of the first end of the first barrel portion 11a1 toward the optical axis of the first barrel portion 11a1.

The first lens barrel 11 can be made of another hard material, such as metal.

In the first barrel 11, the glass lenses 21 to 24 are arranged to be closer to the first end of the first barrel portion 11a1 than the resin lenses 25 and 26 are, in other words, the resin lenses 25 and 26 are arranged to be closer to the rear end of the second barrel portion 11a2 than the glass lenses 21 to 24 are.

The first glass lens 21 is designed as, for example, a cylindrical wide-angle lens. Specifically, the first glass lens 21 is comprised of a dome-shaped optically effective portion 21a with an annular bottom, and a substantially annular flange 21b extending outwardly from the outer periphery of the annular bottom of the optically effective portion 21a.

The optically effective portion 21a projects convexly toward the front of the vehicle, and has a spherical or aspherical effective aperture region having a wider angular field of view. The optically effective portion 21a also has a substantially cylindrical side surface 21a1 that is colored black and has a predetermined outer diameter shorter than an inner diameter of the latch member 11b. The annular flange 21b has opposing front and rear surfaces 21b1 and 21b2; the front surface 21b1 is directed toward the front direction of the vehicle, and the rear surface 21b2 is directed toward the rear direction of the vehicle.

Specifically, the first lens 21 is disposed in the first barrel portion 11a1 such that (1) An apex portion of the optical surface of the optically effective portion 21a is exposed from the opening end wall 10b 1 of the lens-barrel assembly 10b (2) The front surface 21b1 of the annular flange 21b abuts on the latch member 11b For example, cutting the outer periphery of the outer surface of a dome-shaped convex lens enables the first glass lens 21 having the cylindrical side surface 21a1 to be generated.

Because the first glass lens 21 has a wider angular field of view, the lens barrel 10 is capable of receiving light from a wider region in front of the vehicle through the first glass lens 21.

The set of the second glass lens 22, the third glass lens 23, and the fourth glass lens 24 serves as a lens assembly working to have one or more desired optical effects, such as an effect of reducing chromatic aberration, on light incident into the lens barrel 10 via the first glass lens 21.

The second glass lens 22 is designed as, for example, a cylindrical concave meniscus lens having the opposing first and second major surfaces; the first major surface, i.e. the front major surface, faces the first glass lens 21, and the second major surface, i.e. the rear major surface, faces the third glass lens 23. The first major surface of the second glass lens 22 has, as the effective aperture region, a concave surface 22a that is concave toward the front direction of the vehicle, i.e. the light incident side of the lens barrel 10.

The second glass lens 22 is located in the first barrel portion 11a1 behind the first glass lens 21 in alignment with the first glass lens 21 such that an interval between the center of the concave surface 22a of the second glass lens 22 and the center of the optical surface of the optically effective portion 21a of the first glass lens 21 is set to a predetermined first interval.

The third glass lens 23 is designed as, for example, a biconvex lens, and has the opposing first and second major surfaces; the first major surface, i.e. the front major surface, faces the second glass lens 22, and the second major surface, i.e. the rear major surface, faces the fourth glass lens 24.

Each of the first and second major surfaces of the third glass lens 23 has a corresponding one of optical convex surfaces 23a and 23b at the center thereof. The optical convex surfaces 23a and 23b respectively serve as the effective aperture regions; the first optical convex surface 23a is convex toward the second optical glass lens 22, and the second optical convex surface 23b is convex toward the rear direction of the vehicle.

The third glass lens 23 is located in the first barrel portion 11a1 behind the second glass lens 22 in alignment with the second glass lens 22 such that an interval between the center of the first convex surface 23a of the third glass lens 23 and the center of the concave surface 22a of the second glass lens 22 is set to a predetermined second interval.

The fourth glass lens 24 is designed as, for example, a biconcave lens, and has the opposing first and second major surfaces; the first major surface, i.e. the front major surface, faces the third glass lens 23, and the second major surface is directed toward the rear direction of the vehicle. Each of the first and second major surfaces of the fourth glass lens 24 has a corresponding one of first and second optical concave surfaces 24a and 24b that respectively serve as effective optical surfaces; the first optical concave surface 24a is concave toward the third optical glass lens 23, and the second optical concave surface 24b is concave toward the rear direction of the vehicle.

The fourth glass lens 24 is located in the first barrel portion behind the third glass lens 23 in alignment with the third glass lens 23 such that an interval between the center of the second concave surface 23b of the third glass lens 23 and the center of the first concave surface 24a of the fourth glass lens 24 is set to a predetermined third interval.

As described above, the lens assembly of the lens unit 10a is comprised of the second to fourth glass lenses 22 to 24, but the number of lenses in the lens assembly and the combination of types of lenses in the lens assembly can be freely changed depending on required optical effects of the lens assembly.

Each of the second and third glass lenses 22 and 23 has a diameter, i.e. a radial dimension, shorter than the outer diameter of the optically effective portion. 21a of the first glass lens 21. For this reason, if the second and third glass lenses 22 and 23 are simply installed in the first barrel portion 11a1 in alignment with the first glass lens 21, a gap may be provided between each of the second and third lenses 22 and 23 and the inner surface of the first barrel portion 11a1.

From this viewpoint, the lens barrel assembly 10b is comprised of an intermediate lens barrel 12 that has, for example, a substantially tubular or hollow cylindrical shape and is made of, for example, the same resin material as the resin material of the first lens barrel 11. The intermediate lens barrel 12 is coaxially fitted in the first barrel portion 1.

The intermediate lens barrel 12 has formed therein a cylindrical inner chamber, in which the second and third lenses 22 and 23 are fitted in alignment with the first glass lens 21 with the second internal being maintained between the second and third glass lenses 22 and 23.

For example, the intermediate lens barrel 12 has first and second ends, each of which has an opening; the first end of the intermediate lens barrel 12 is closer to the first glass lens 21 than the second end thereof is, and the second end of the intermediate lens barrel 12 is closer to the fourth glass lens 24 than the first end thereof is.

The intermediate lens barrel 12 has an outer diameter that is set to be substantially equal to the inner diameter D1 of the first barrel portion 11a1 or to be slightly smaller than the inner diameter D1 thereof such that the intermediate lens barrel 12 is movable in the first barrel portion 11a1 in the optical axis of the lens unit 10a without wobbling or rattling. The intermediate lens barrel 12 has an axial length in the optical axis of the lens unit 10a such that the rear-side convex portion of the third glass lens 23 projects from the opening of the second end of the third glass lens 23.

The first end of the intermediate lens barrel 12 is located to be in pressure contact with the rear surface 21b2 of the annular flange 21b of the first glass lens 21 toward the front direction of the vehicle. The first end of the intermediate lens barrel 12 has formed an annular stopper 12a projecting inwardly from the inner periphery of the first end of the intermediate lens barrel 12. The annular stopper 12a is located to be interposed between the rear surface 21b2 of the annular flange 21b of the first glass lens 21 and the outer periphery of the first major surface of the second glass lens 22; the outer periphery surrounds the concave surface 22a.

That is, the annular stopper 12a is configured to have a shape and size that disables the annular stopper 12a projecting inwardly from the inner periphery of the first end of the intermediate lens barrel 12 from covering the concave surface 22a of the second glass lens 22.

The lens module 10 includes a first spacer 13 having a substantially hollow cylindrical shape and having opposing front and rear surfaces. The first spacer 13 is made of, for example, the same resin material as the resin material of the first lens barrel 11. The first spacer 13 is coaxially fitted in the intermediate lens barrel 12 while being interposed between the second and third glass lenses 22 and 23 to thereby maintain the third interval between the second and third glass lenses 22 and 23.

That is, the first stopper 13 is located to face both the outer periphery of the second major surface of the second glass lens 22 and the outer periphery of the first major surface of the third glass lens 23 while uncovering the concave surface 22a of the second glass lens 22 and the convex surface 23a of the third glass lens 23.

The first spacer 13 has an outer diameter that is set to be substantially equal to the inner diameter of the intermediate lens barrel 12 or to be slightly smaller than the inner diameter thereof such that the first spacer 13 is movable in the intermediate lens barrel 12 in the optical axis of the lens unit 10a without wobbling or rattling.

The lens module 10 also includes a second spacer 14 having a substantially hollow cylindrical shape and having opposing front and rear surfaces. The second spacer 14 is made of, for example, the same resin material as the resin material of the first lens barrel 11. The second spacer 14 is coaxiedly fitted in the first barrel portion 11a1 while being interposed between the second and third glass lenses 22 and 23 to thereby maintain the third interval between the second and third glass lenses 22 and 23. That is, the second stopper 14 is located to face both the outer periphery of the second major surface of the third glass lens 23 and the outer periphery of the first major surface of the fourth glass lens 24 while uncovering the convex surface 23b of the third glass lens 23 and the concave surface 24a of the fourth glass lens 24.

In particular, the third glass lens 23 has opposing front and rear end portions, and the third glass lens 23 is disposed in the intermediate lens barrel 12 such that the rear end portion of the third glass lens 23 projects outwardly toward the rear direction of the vehicle from the opening of the second end of the intermediate lens barrel 12.

The second spacer 14 has an outer diameter that is set to be substantially equal to the inner diameter of the first barrel portion 11a1 or to be slightly smaller than the inner diameter thereof such that the second spacer 14 is movable in the intermediate lens barrel 12 in the optical axis of the lens unit 10a without wobbling or rattling.

Next, the following describes how the first and second resin lenses 25 and 26 are held in the first lens barrel 11 of the lens barrel assembly 10b.

The lens barrel assembly 10b is comprised of a second lens barrel 16 for holding the first and second resin lenses 25 and 26. The second lens barrel 16 has, for example, a substantially hollow cylindrical chamber therein, and is made of, for example, the same resin material as the resin material of the first lens barrel 11. The second lens barrel 16 is coaxially fitted in the first barrel portion 11a1. The second lens barrel 16 has opposing front-end wall 16a and rear-end wall 16b, each of which has an opening thereinside. The front-end wall 16a of the second lens barrel 16 is closer to the fourth glass lens 24 than the rear-end wall 16b is.

Figure 2:
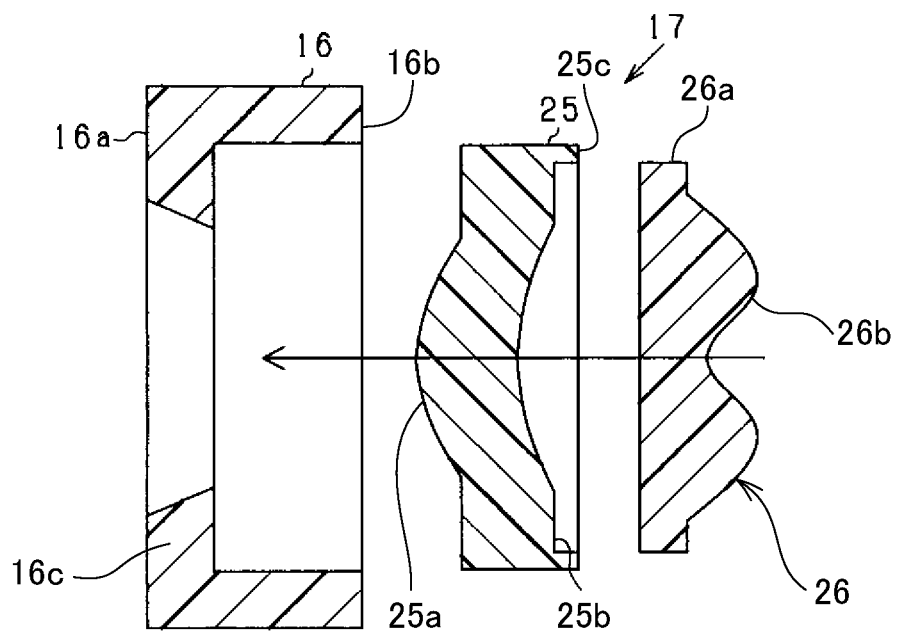
FIG. 2 is an exploded axial cross-sectional view schematically illustrating a situation where first and second resin lenses are inserted into a second lens barrel according to the first embodiment.
Figure 3:
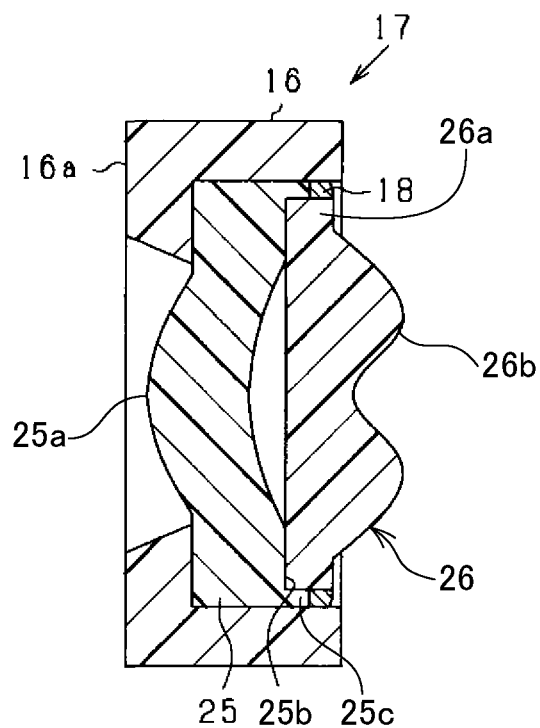
FIG. 3 is an axial cross-sectional view schematically illustrating the assembly of the first and second resin lenses disposed in the second lens barrel according to the first embodiment.

FIG. 2 is an exploded axial cross-sectional view schematically illustrating a situation where the first resin lens 25 and the second resin lens 26 are inserted into the second lens barrel 16 through the opening of the rear-end wall 16b. FIG. 3 is an axial cross-sectional view schematically illustrating the assembly of the first and second resin lenses 25 and 26 disposed in the second lens barrel 16. In FIG. 2, an arrow represents the insertion direction of the first and second resin lenses 25 and 26 into the second lens barrel 16.

The first and second resin lenses 25 and 26 are located in the first barrel portion 11a1 behind the fourth glass lens 24. The first resin lens 25 is located to be closer to the fourth glass lens 24 than the second resin lens 26 is.

The first resin lens 25 is designed as, for example, a cylindrical convex meniscus lens having the opposing first and second major surfaces at respective front and rear ends; the first major surface, i.e. the front major surface, faces the fourth glass lens 24, and the second major surface faces the second resin lens 26.

The first major surface of the first resin lens 25 has, as the effective aperture region, a convex surface 25a that is convex toward the front direction of the vehicle, i.e. the fourth glass lens 24.

The first resin lens 25 is located in the first barrel portion 11a1 behind the fourth glass lens 24 in alignment with the first to fourth glass lenses 21 to 24 such that an interval between the center of the convex surface 25a of the first resin lens 25 and the center of the second optical concave surface 24b of the fourth glass lens 24 is set to a predetermined fourth interval.

The first resin lens 25 has an outer circumferential surface shaped to be in conformity with the inner circumferential surface of the hollow cylindrical chamber of the second lens barrel 16, and the first resin lens 25 is coaxially fitted in the hollow cylindrical chamber of the second lens barrel 16 while the convex surface 25a is fitted in the opening of the first front-end wall 16a.

The second resin lens 26 is designed as, for example, a cylindrical plano-concave lens having a circular plate-like lens body 26a having a front surface as the first major surface, and a rear convex surface 26b as the second major surface.

The first major surface of the circular plate-like lens body 26a faces the first resin lens 25, and the second major surface of the circular plate-like lens body 26a faces the second circular opening end wall 10b2. The second major surface 26b of the second resin lens 26 serves as the effective aperture region, and is convex toward the opening end wall 10b2.

The second resin lens 26 is located in the first barrel portion 11a1 behind the first resin lens 25 in alignment with the first resin lens 25, and is combined with the first resin lens 25 with an adhesive member 18, which is comprised of an adhesive, serving as a non-pressure fixture member. That is, the assembly of the first and second resin lenses 25 and 26 fixedly disposed in the second lens barrel 16 with the adhesive member 18 will be referred to as a resin unit 17.

As described above, the first resin lens 25 is designed as the convex lens so that the first resin lens 25 has a positive focal point. In contrast, the second resin lens 26 is designed as the concave lens so that the second resin lens 26 has a negative focal point. That is, the resin unit 17 is comprised of the first resin lens 25 with the positive focal point and the second resin lens 26 with the negative focal point; the second resin lens 26 is combined with the first resin lens 25.

The assembly of the first resin lens 25 consisting of a convex lens and the second resin lens 26 consisting of a concave lens has a function of 1. Receiving incident light entering the first lens barrel 11 through the first glass lens 21 and travelling through the second to fourth glass lenses 22 to 24

2. Guiding the received incident light onto the color image sensor 101d as an optical image while reducing aberration, such as distortion, in the optical image The number of lenses in the resin unit 17 and/or the combination of types of lenses in the resin unit 17 can be freely changed depending on what optical effects the resin unit 17 has as long as the lenses in the resin unit 17 include at least one convex lens having a positive focal point, and at least one concave lens having a negative focal point.

For example, each of the first and second resin lenses 25 and 26 is made of, for example, cycloolefin polymer (COP) resin, and COP resin has the elastic modulus of, for example, 3 GPa. In contrast, glass, which is a material of the first glass lens 21 has the elastic modulus of, for example, 80 GPa or thereabout. The resin material used for the first lens barrel 11 has the elastic modulus of, for example, 10 GPa or thereabout. That is, the elastic modulus of the material used for each of the first and second resin lenses 25 and 26 is smaller than the elastic materials of the other materials used for the respective other lenses and the lens barrels, causing the first and second resin lenses 25 and 26 to be more deformable.

The first resin lens 25 has formed an annular recess 25b in the second major surface thereof, and a circular concave 25c formed in the annular recess 25b; the annular recess 25b is shaped to be in conformity with the circular plate-like lens body 26a of the second resin lens 26. That is, the first resin lens 25 includes an annular outer wall 25d at the rear end, so that the annular recess 25b is formed inside the annular outer wall 25d. The annular outer wall 25d is located on the non-optical outer periphery of the second major surface.

Specifically, the circular plate-like lens body 26a of the second resin lens 26 is loosely fitted in the annular recess 25b of the first resin lens 25, so that the second resin lens 26 is integrated with the first resin lens 25.

In particular, at described above, the lens module 10 is configured such that the circular plate-like lens body 26a of the second resin lens 26 of the second resin lens 26 is loosely fitted in the annular recess 25b of the first resin lens 25. That is, the second resin lens 26 is rotatably supported in the annular recess 25b of the first resin lens 25.

This configuration of the lens module 10 enables, before combination of the first and second resin lenses 25 and 26 with the adhesive member 18, the second resin lens 26 to rotate relative to the first resin lens 25, making it possible to align the first resin lens 25 with the second resin lens 26 with higher accuracy.

Note that, because the glass lenses 21 to 24 are heavy, the lens module 10 is preferably capable of using a strong force for holding the glass lenses 21 to 24 in the first lens barrel 11 without the glass lenses 21 to 24 wobbling or rattling. In addition, because the lens module 10 is used for the vehicular imaging device 100, the lens module 10 is preferably configured to withstand wide temperature changes. In particular, each of the glass lenses 21 to 24 has an expansion coefficient, which will be referred to as a lens expansion coefficient, with respect to temperature changes, and the adhesive member 18 has an expansion coefficient, which will be referred to as an adhesive expansion coefficient, with respect to temperature changes; the temperature expansion coefficient is different from the adhesive expansion coefficient. For this reason, it is undesirable to hold the glass lenses 21 to 24 in the first lens barrel 11 using an adhesive.

From this viewpoint, the lens module 10 is preferably configured to strongly press the glass lenses 21 to 24 in the optical axis direction of the lens module 10, i.e. press the glass lenses 21 to 24 parallel to the optical axis direction of the lens module 10. On the other hand, directly pressing the resin lenses 25 and 26 with strong force enough to hold the glass lenses 21 to 24 would result in the resin lenses 25 and 26 being likely to creep or become deformed depending on temperature changes.

For satisfying both of the pressure holding of the glass lenses 21 to 24 and avoidance of the direct pressure holding of the resin lenses 25 and 26, the lens barrel assembly 10b includes a holding mechanism HM, which is comprised of a first press member 15 and the adhesive member 18 configured to apply pressing force to the glass lenses 21 to 24 and the second lens barrel 16 to perform pressure holding of the glass lenses 21 to 24 and the second lens barrel 16 and non-pressure holding of the resin lenses 25 and 26 while preventing the pressing force from being directly applied to the resin lenses 25 and 26.

Specifically, the second lens barrel 16 coaxially fitted in the first barrel portion 11a1 is disposed such that the front-end wall 16a is in close contact with the outer periphery of the second major surface of the fourth glass lens 24. The second lens barrel 16 is located to surround the outer circumferential edge of each of the first and second resin lenses 25 and 26, so that the first and second resin lenses 25 and 26 are disposed in the second lens barrel 16 in alignment with the first to fourth glass lenses 21 to 25.

The first press member 15 has a substantially hollow cylindrical shape, and is made of, for example, the same resin material as the resin material of the first lens barrel 11. The first press member 15 is disposed between the rear-end wall 16b and the second circular opening end wall 10b2 in alignment with the first and second resin lenses 25 and 26.

For example, the first press member 15 is comprised of a hollow cylindrical base 15a having opposing front and rear ends; the hollow cylindrical base 15a is coaxially disposed in a rear end of the second barrel portion 11a2 of the first lens barrel 11 to be rotatable with respect to the second barrel portion 11a2 about the optical axis of the lens module 10.

The first press member 15 is also comprised of an external, i.e. a male, thread member 15b helically formed on the outer circumferential surface of the hollow cylindrical base 15a in the axial direction of the lens module 10. The rear end of the second barrel portion 11a2 has formed an internal, i.e. female, thread member IT helically on its inner circumferential surface along the axial direction of the lens module 10; the external thread member 15b and the internal thread member IT are arranged to be meshed with each other.

The first press member 15 is further comprised of a press projection 15c projecting an inner periphery of the front end of the hollow cylindrical base 15a toward the rear-end wall 16b of the second lens barrel 16 such that the press projection 15c is in pressure contact with the second rear-end wall 16b.

That is, while the first press member 15 is installed in the rear end of the second barrel portion 11a2 of the first lens barrel 11 with the external thread member 15b being completely meshed with the internal thread member IT, the press projection 15c of the first press member 15 presses the rear-end wall 16b of the second lens barrel 16 toward the fourth glass lens 24, thus causing the front-end wall 16a of the second lens barrel 16 to press the outer periphery of the second optical concave surface 24b toward the third glass lens 23.

The front end of the hollow cylindrical base 15a has an outer periphery around the press projection 15c. The outer periphery of the front end of the hollow cylindrical base 15a is arranged to abut on the annular shoulder surface SS of the first lens barrel 11 upon the external thread member 15b being completely meshed with the internal thread member IT.

The second lens barrel 16 has an outer diameter that is set to be substantially equal to the inner diameter D1 of the first barrel portion 11a1 or to be slightly smaller than the inner diameter D1 thereof such that the second lens barrel 16 is movable in the first barrel portion 11a1 in the optical axis of the lens unit 10a without wobbling or rattling.

The front-end wall 16a of the second lens barrel 16 has formed an annular stopper 16c projecting inwardly from the inner periphery of the front-end wall 16a of the second lens barrel 16. The annular stopper 16c is located to be interposed between the second optical concave surface 24b of the fourth glass lens 24 and the outer periphery of the convex surface 25a of the first resin lens 25. That is, the annular stopper 16c is configured to have a shape and size that prevents it projecting inwardly from the inner periphery of the front-end wall 16a of the second lens barrel 16 from covering the optically effective portion of the second optical concave surface 24b and the optically effective portion of the convex surface 25a of the fourth convex lens 25.

As described above, the first and second resin lenses 25 and 26 disposed in the second lens barrel 16 are stuck to each other with the adhesive member 18 while the circular plate-like lens body 26a of the second resin lens 26 is fitted in the annular recess 25b, resulting in the first and second resin lenses 25 and 26 and the second lens barrel 16 being integrated with each other as the resin unit 17.

That is, the adhesive member 18 works to stick, i.e. fasten, the first and second resin lenses 25 and 26 to each other, and fasten the first and second resin lenses 25 and 26 to the second lens barrel 16. Specifically, the adhesive member 18 has extended to fill in spaces formed among the second major surface of the first resin lens 25, the circumferential edge of the second resin lens 26, and the second lens barrel 16. For example, when the first and second resin lenses 25 and 26 have been assembled to each other in the second lens barrel 16 (see FIG. 2), applying the adhesive member 18 to the assembled first and second resin lenses 25 and 26 in the second lens barrel 16 once enables the elements 25, 26, and 16 to be fixed to each other, resulting in the resin unit 17 being fabricated.

As described above, the first and second resin lenses 25 and 26 and second lens barrel 16 are fixed to each other with the adhesive member 18. Because each of the first and second resin lenses 25 and 26 is lighter in weight than any one of the first to fourth glass lenses 21 to 24, weaker holding force makes it possible to hold the first and second resin lenses 25 and 26 without wobbling or rattling.

Additionally, the resin-based components 25, 26, 16, and 18 relatively have similar values of linear expansion coefficient. This reduces cracks in at least one of the resin-based components 25, 26, 16, and 18 due to the difference in linear expansion coefficient among the resin-based components 25, 26, 16, and 18.

It follows from what has been described that the first and second resin lenses 25 and 26 are suitable for being held with the adhesive member 18.

In particular, the first and second resin lenses 25 and 26 are integrated with each other while the circular plate-like lens body 26a of the second resin lens 26 is fitted in the annular recess 25b. This configuration therefore makes it possible to, even if the first and second resin lenses 25 and 26 wobble to cause the interval between the assembly of the first to fourth glass lenses 21 to 24 and each of the first and second resin lenses 25 and 26 to deviate from a designed interval, reduce deterioration of the performance of each of the lenses 25 and 26. This is because this deviation simultaneously has occurred in the lenses 25 and 26, preventing the occurrence of errors in chromatic-aberration reductions due to this deviation.

Similarly, this configuration therefore makes it possible to, even if the first and second resin lenses 25 and 26 wobble to cause the optical axis of each of the lenses 25 and 26 to misalign with the optical axis of the assembly of the first to fourth glass lenses 21 to 24, reduce deterioration of the performance of each of the lenses 25 and 26. This is because this deviation simultaneously has occurred in the lenses 25 and 26, preventing the occurrence of errors in chromatic-aberration reductions due to this deviation.

Figure 4:
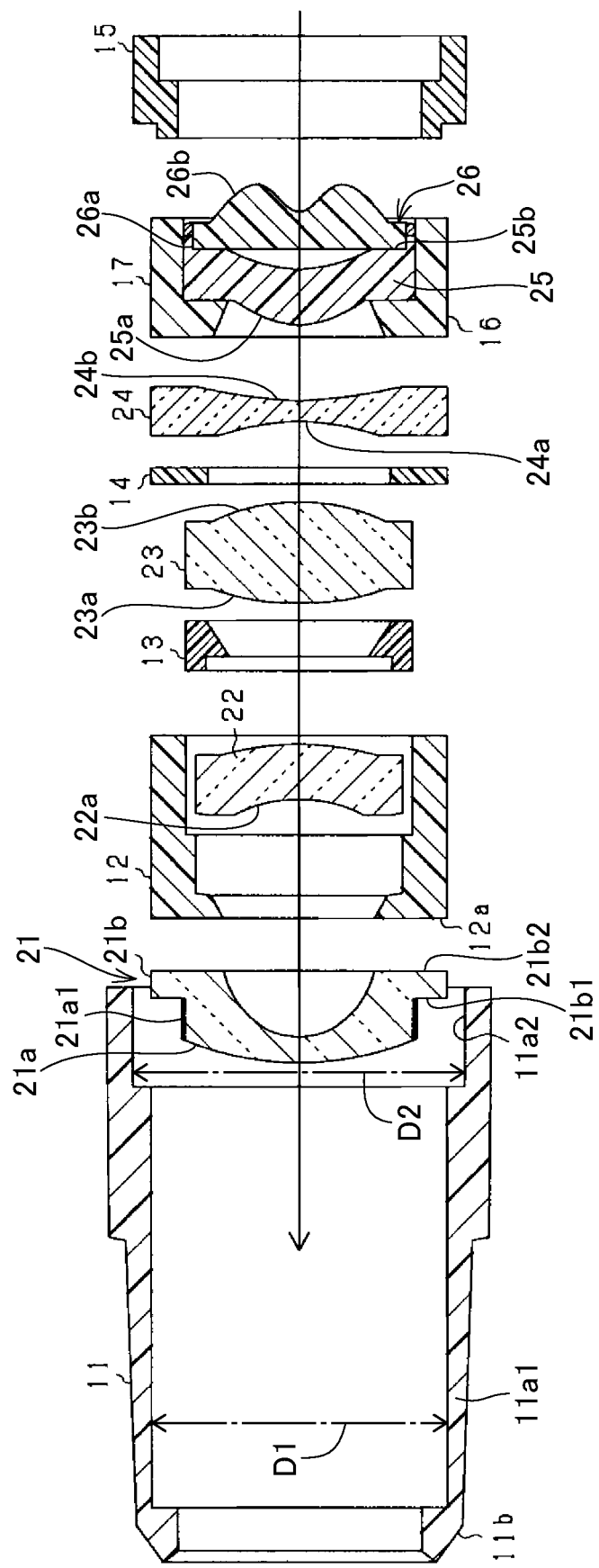
FIG. 4 is an exploded axial cross-sectional view schematically illustrating a situation where first to fourth glass lenses and a resin unit are inserted into a first lens barrel according to the first embodiment.

Next, the following describes an example of the procedure of fabricating the lens module 10 with reference to FIG. 4. FIG. 4 is an exploded axial cross-sectional view schematically illustrating a situation where the first to fourth glass lenses 21 to 24 and the resin unit 17 including the first and second resin lenses 25 and 26 are inserted into the first lens barrel 11 via the opening of the rear end of the second barrel portion 11a2 of the first lens barrel 11 in this order. In FIG. 4, for simply illustration of the lens module 10, the components 15b and IT are omitted.

First, the first lens barrel 11 comprised of the first barrel portion 11a1 and second barrel portion 11a2 is prepared. Then, the first glass lens 21 is inserted into the first lens barrel 11 such that the front surface 21b1 of the annular flange 21b of the first glass lens 21 abuts on the latch member 11b of the first lens barrel 11. This enables the first glass lens 21 to be localized, i.e. positioned. Next, the intermediate lens barrel 12 is inserted into the first lens barrel 11 such that the first end of the intermediate lens barrel 12 abuts on the rear surface 21b2 of the annular flange 21b of the first glass lens 21.

Subsequently, the second glass lens 22 is inserted into the intermediate lens barrel 12 such that the outer periphery of the first major surface of the second glass lens 22 abuts on the annular stopper 12a of the intermediate lens barrel 12. This enables the second glass lens 22 to be localized.

Following the insertion of the second glass lens 22 into the intermediate lens barrel 12, the first spacer 13 is inserted into the intermediate lens barrel 12 such that the front surface of the first spacer 13 abuts on the outer periphery of the second major surface of the second glass lens 22. Thereafter, the third glass lens 23 is inserted into the intermediate lens barrel 12 such that (1) The outer periphery of the first major surface of the third glass lens 23 abuts on the rear surface of the first spacer 13

(2) The rear end portion of the third glass lens 23 projects outwardly toward the rear direction of the vehicle from the opening of the second end of the intermediate lens barrel 12

Then, the second spacer 14 is inserted into the first lens barrel 11 such that the front surface of the second spacer 14 abuts on the outer periphery of the second major surface of the third glass lens 23.

Because the rear end portion of the third glass lens 23 projects outwardly toward the rear direction of the vehicle from the opening of the second end of the intermediate lens barrel 12, it is possible to easily make the front surface of the second spacer 14 abut onto the outer periphery of the second major surface of the rear end portion, which projects from the intermediate lens barrel 12. This configuration enables the third glass lens 23 to reliably abut onto the second spacer 14, making it possible for the third glass lens 23 and second spacer 14 to reliably transfer pressing force by the first press member 15 toward the front of the vehicle.

Following insertion of the second spacer 14 into the first lens barrel 11, the fourth glass lens 24 is inserted into the first lens barrel 11 such that the outer periphery of the first major surface of the fourth glass lens 24 abuts on the rear surface of the second spacer 14.

Next, the resin unit 17, which is the assembly of the first and second resin units 25 and 26 being fixedly disposed in the second lens barrel 16 with the adhesive member 18, is inserted into the first lens barrel 11 such that the front-end wall 16a of the second lens barrel 16 of the resin unit 17 is in closely contact with the outer periphery of the second major surface of the fourth glass lens 24.

Because the second barrel portion 11a2 serves as the diameter expansion portion to have the inner diameter D2 longer than the inner diameter D1 of the first barrel portion 11a1, it is possible to smoothly insert the first to fourth glass lenses 21 to 24 into the first lens barrel 11 via the second barrel portion 11a2 without the first to fourth glass lenses 21 to 24 being scratched even if the internal thread member IT has been formed at the inner circumferential surface of the rear end of the second barrel portion 11a2.

Following the insertion of the resin unit 17 into the first lens barrel 11, the front end of the first press member 15, which is comprised of the hollow cylindrical base 15a having the external thread member 15b formed on the outer circumferential surface of the base 15a, is inserted into the second barrel portion 11a2 of the first lens barrel 11 while the front end of the external thread member 15b is engaged with the rear end of the internal thread member IT formed on the inner circumferential surface of the second barrel portion 11a2.

Then, the first press member 15 is screwed into the second barrel portion 11a2, so that the first press member 15 moves toward the resin unit 17 while twisting. When the external thread member 15b of the first press member 15 is completely meshed with the internal thread member IT of the second barrel portion 11a2, the press projection 15c of the first press member 15 presses the rear-end wall 16b of the second lens barrel 16 toward the fourth glass lens 24, thus causing the front-end wall 16a of the second lens barrel 16 to press the outer periphery of the second optical concave surface 24b toward the third glass lens 23 parallel to the optical axis direction of the second lens barrel 16.

Because the second lens barrel 16 is harder than each of the first and second resin lenses 25 and 26, the above configuration in which the first press member 15 pushes the second lens barrel 16 prevents each of the first and second resin lenses 25 and 26 from easily creeping or becoming deformed as compared with a comparative configuration in which the first resin lens 25 or the second resin lens 26 is directly pushed.

Pressing the outer periphery of the second optical concave surface 24b of the fourth glass lens 24 toward the third glass lens 23 causes the outer periphery of the second optical concave surface 24b of the fourth glass lens 24 to press the second spacer 14 toward the front direction of the vehicle. This causes the second spacer 14 to press the outer periphery of the second major surface of the third glass lens 23 toward the first spacer 13. This causes the first spacer 13 to press the outer periphery of the second major surface of the second glass lens 22.

Pressing the outer periphery of the second major surface of the second glass lens 22 causes the outer periphery of the second major surface of the second glass lens 22 to press the annular stopper 12a of the intermediate lens barrel 12. This causes the annular stopper 12a of the intermediate lens barrel 12 to press the rear surface 21b2 of the annular flange 21b of the first glass lens 21 toward the front direction of the vehicle.

At that time, because the front surface 21b1 of the annular flange 21b of the first glass lens 21 is fixedly localized, i.e. held in position, by the latch member 11b, the components 22, 13, 23, 14, 24, and 17 located between the first glass lens 21 and the first press member 15 are tightly fixed to each other therebetween in the optical-axis direction of the lens module 10 without each adjacent pair of the components 21, 22, 13, 23, 14, 24, and 17 being separated.

Pressing the components 21, 22, 13, 23, 14, 24, and 17 by the first press member 15 while the front glass lens 21 is fixed to the latch member 11b enables each of the first to fourth glass lenses 21 to 24, the first and second spacers 13 and 14, and the resin unit 17 to be located at a corresponding position in the optical-axis direction of the lens module 10.

Additionally, the first to fourth glass lenses 21 to 24, the first and second spacers 13 and 14, and the resin unit 17 are pushed by the first press member 15 to the latch member 11b of the first lens barrel 11 in the optical axis direction of the lens module 10 while the first glass lens 21 abuts on the inner surface of the latch member 11b, the second glass lens 22 abuts on the rear surface of the annular stopper 12a of the intermediate lens barrel 12, the third glass lens 23 abuts on the rear surface of the first stopper 13, and the fourth glass lens 24 abuts on the rear surface of the second stopper 14.

This configuration enables the first to fourth glass lenses 21 to 24 to be radially localized in the first lens barrel 11.

As described above, the outer periphery of the front end of the hollow cylindrical base 15a is arranged to abut on the annular shoulder surface SS of the first lens barrel 11 upon the external thread member 15b being completely meshed with the internal thread member IT. This prevents the hollow cylindrical base 15a of the first press member 15 from moving beyond the annular shoulder surface SS of the first lens barrel 11. This therefore results in the magnitude of the pressing force by the press projection 15c to the second lens barrel 16 falling within a predetermined range.

The lens module 10 configured set forth above obtains the following benefits.

For holding the first to fourth glass lenses 21 to 24 in the first lens barrel 11 without wobbling or rattling, it is desired to strongly press the first to fourth glass lenses 21 to 24 in the optical axis direction of the first to fourth glass lenses 21 to 24. In contrast, directly pressing the first and second resin lenses 25 and 26 with strong force enough to hold the first to fourth glass lenses 21 to 24 would result in at least one of the first and second resin lenses 25 and 26 creeping or become deformed. As another view, the first and second resin lenses 25 and 26 are suitable for being held with an adhesive.

On the basis of these circumstances, the lens module 10 is configured to (1) Fixedly hold the first and second resin lenses 25 and 26 in the second lens barrel 16 with the adhesive member 18

(2) Pressing the first to fourth glass lenses 21 to 24 and the second lens barrel 16 to a part of the first lens barrel 11 to thereby fixedly hold the first to fourth glass lenses 21 to 24 in the first lens barrel 11

This configuration enables the first type of lenses, i.e. the glass lenses 21 to 24, to be held in the first lens barrel 11 by first means of pressing force suitable for holding of the glass lenses 21 to 24, and the second type of lenses, such as the resin lenses 25 and 26, to be held in the first lens barrel 11 by second means of adhesive force suitable for holding of the resin lenses 25 and 26. This therefore makes it possible to hold the first type of lenses 21 to 24 and the second type of lenses 25 and 26 without at least one of the first type of lenses 21 to 24 and the second type of lenses 25 and 26 wobbling.

The assembly of the first resin lens 25 consisting of a convex lens and the second resin lens 26 consisting of a concave lens, which are integrated with each other as the resin unit 17 in the first lens barrel, has a function of 1. Receiving incident light entering the first lens barrel 11 through the first glass lens 21 and travelling through the second to fourth glass lenses 22 to 24

2. Guiding the received incident light onto the color image sensor 101d as an optical image while reducing aberration, such as distortion, in the optical image This configuration makes it possible to, even if the first and second resin lenses 25 and 26 wobble to cause the interval between the assembly of the first to fourth glass lenses 21 to 24 and each of the first and second resin lenses 25 and 26 to deviate from a designed interval, reduce deterioration of the performance of each of the lenses 25 and 26. This is because this deviation simultaneously has occurred in the lenses 25 and 26, preventing the occurrence of errors in chromatic-aberration reductions due to this deviation.

Similarly, this configuration therefore makes it possible to, even if the first and second resin lenses 25 and 26 wobble to cause the optical axis of each of the lenses 25 and 26 to misalign with the optical axis of the assembly of the first to fourth glass lenses 21 to 24, reduce deterioration of the performance of each of the lenses 25 and 26. This is because this deviation simultaneously has occurred in the lenses 25 and 26, preventing the occurrence of errors in chromatic-aberration reductions due to this deviation.

The elastic modulus of the second lens barrel 16 is set to be smaller than the elastic modulus of each of the first and second resin lenses 25 and 26. This prevents each of first and second resin lenses 25 and 26 from creeping or becoming deformable even if the second lens barrel 16 is pressed in the axial direction of the lens module 10.

Second Embodiment

The following describes a lens module 10A according to the second embodiment of the present disclosure with reference to FIGS. 5 to 8. The configuration and functions of the lens module 10A according to the second embodiment are mainly different from those of the lens module 10 according to the first embodiment by the following points. The following therefore mainly describes the different points.

The lens module 10A according to the second embodiment is comprised of a second press member 16 configured to press the first and second resin lenses 25 and 26 in the second lens barrel 16 in the axial direction of the lens module 10A to thereby fixedly hold the first and second resin lenses 25 and 26.

The following describes the lens module 10A in detail with reference to FIGS. 5 to 8.

Figure 5:
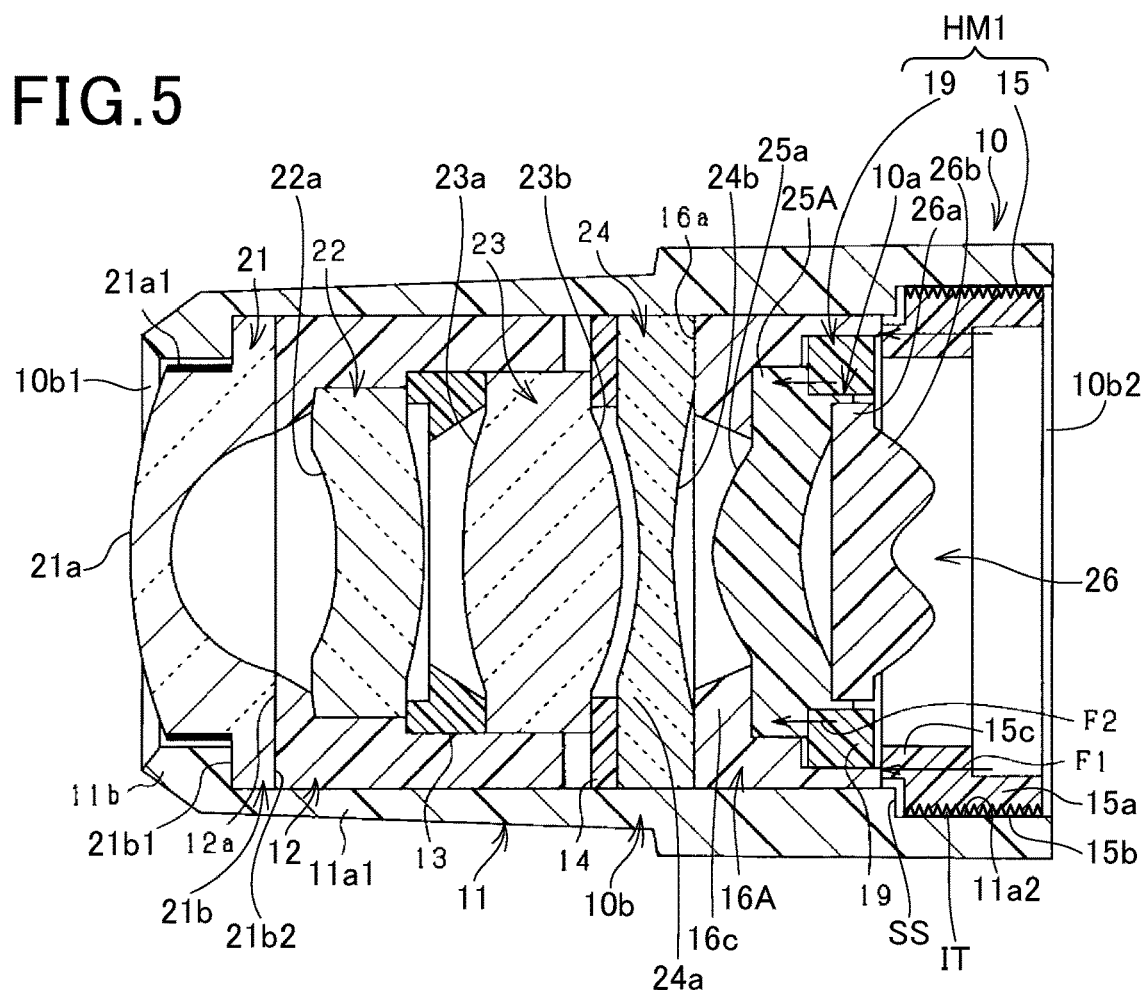
FIG. 5 is a longitudinal cross-sectional view of a lens module according to the second embodiment of the present disclosure.
Figure 6:
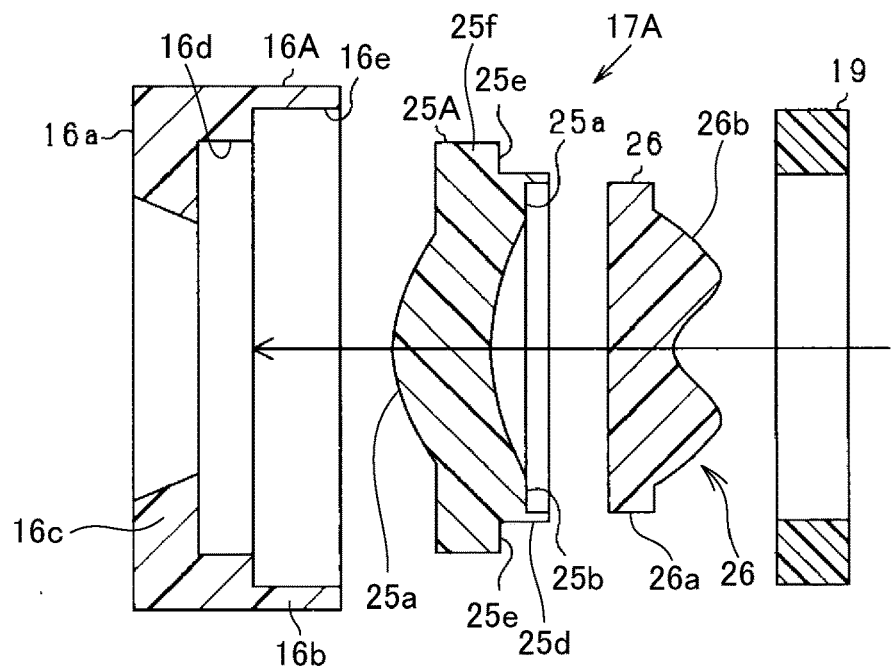
FIG. 6 is an exploded axial cross-sectional view schematically illustrating a situation where first and second resin lenses are inserted into a second lens barrel according to the second embodiment.
Figure 7:
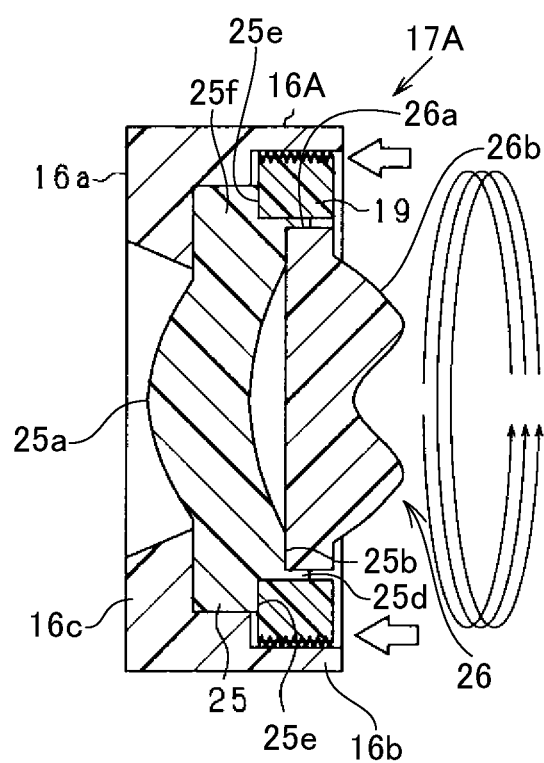
FIG. 7 is an axial cross-sectional view schematically illustrating the assembly of the first and second resin lenses disposed in the second lens barrel according to the second embodiment.

FIG. 5 is a longitudinal cross-sectional view of the lens module 10A, and FIG. 6 is an exploded axial cross-sectional view schematically illustrating a situation where a first resin lens 25A and the second resin lens 26 are inserted into a second lens barrel 16A through the opening of the rear-end wall 16b. FIG. 7 is an axial cross-sectional view schematically illustrating the assembly of the first and second resin lenses 25A and 26 disposed in the second lens barrel 16A. In FIG. 6, an arrow represents the insertion direction of the first resin lens 25A and the second resin lens 26 into the second lens barrel 16A.

As compared to the first resin lens 25, the first resin lens 25A includes an annular outer groove 25e formed at the non-optical outer periphery of the second major surface of the first resin lens 25A. That is, the annular outer groove 25e is located to surround the annular outer wall 25d, thus surrounding the annular recess 25b. For example, cutting the outer edge of the annular outer wall 25d enables the annular outer groove 25e to be formed.

Like the first embodiment, for satisfying both of the pressure holding of the glass lenses 21 to 24 and avoidance of the direct pressure holding of the resin lenses 25A and 26, the lens barrel assembly 10b includes a holding mechanism HM1, which is comprised of the first press member 15 and a second press member 19, for pressure holding of the glass lenses 21 to 24 while preventing pressing force from being directly applied to the resin lenses 25A and 26.

Specifically, the second press member 19 has a substantially hollow cylindrical shape, and is made of, for example, the same resin material as the resin material of the second lens barrel 16A.

The second press member 19 is disposed in the annular outer groove 25e. The annular outer groove 25e has an annular bottom that serves as a pressed portion to be pressed by the second press member 19.

In other words, the first resin lens 25A has an annular non-optical end portion around a center optical portion thereof, and the annular non-optical end portion has an inner peripheral portion with a predetermined thickness in the optical axis direction, and an outer peripheral portion 25f with a predetermined thickness in the optical axis direction smaller than the thickness of the inner peripheral portion. The outer peripheral portion 25f serves as the pressed portion.

The second lens barrel 16A has a first hollow cylindrical chamber 16d, and a second hollow cylindrical chamber 16e coaxially and communicably coupled to the first hollow cylindrical chamber 16d. Each of the first and second hollow cylindrical chambers 16d and 16e has an inner diameter, and the inner diameter of the second hollow cylindrical chamber 16e is larger than the inner diameter of the first hollow cylindrical chamber 16d. That is, the second hollow cylindrical chamber 16e serves as a diameter expansion portion.

The outer circumferential surface of the first resin lens 25 is shaped to be in conformity with the inner circumferential surface of the first hollow cylindrical chamber 16d1, and the first resin lens 25 is coaxially fitted in the first hollow cylindrical chamber 16d1 of the second lens barrel 16 while the convex surface 25a is fitted in the opening of the first front-end wall 16a.

The outer circumferential surface of the second press member 19 that is disposed in the annular outer groove 25e is shaped to be in conformity with the inner circumferential surface of the second hollow cylindrical chamber 16d2. The outer circumferential surface of the second press member 19 that is disposed in the annular outer groove 25e is coaxially fitted in the second hollow cylindrical chamber 16e of the second lens barrel 16A.

In particular, as illustrated in FIG. 7, the second press member 19 is comprised of an external, i.e. a male, thread member 19a helically formed on the outer circumferential surface of the second press member 19 in the axial direction thereof.

The second lens barrel 16A is comprised of an internal, i.e. a female, thread member ITA helically formed on the inner circumferential surface of the second hollow cylindrical chamber 15d2 along the axial direction of the second lens barrel 16A; the external thread member 19a and the internal thread member ITA are arranged to be meshed with each other, so that the second press member 19 is disposed in the second hollow cylindrical chamber 16d2.

That is, while the second press member 19 is installed in the second hollow cylindrical chamber 15d2 with the external thread member 19a being completely meshed with the internal thread member ITA, the second press member 19 presses the annular bottom, i.e. the outer peripheral portion 25f, of the annular outer groove 25e of the first resin lens 25A toward the fourth glass lens 24, thus (1) Fixing the first resin lens 25A and the second resin lens 26 integrated with the first resin lens 25A to the second lens barrel 16A (2) Causing the front-end wall 16a of the second lens barrel 16A to press the outer periphery of the second optical concave surface 24b toward the third glass lens 23

That is, the assembly of the first and second resin lenses 25A and 26 fixedly disposed in the second lens barrel 16A with the second press member 19 will be referred to as a resin unit 17A.

Note that the circular plate-like lens body 26a of the second resin lens 26 can have an outer diameter slightly longer than the inner circumferential surface of the annular recess 25b, so that the circular plate-like lens body 26a of the second resin lens 26 can be fixedly fitted in the inner circumferential surface of the annular recess 25b. Alternatively, the second resin lens 26 can be adhered to the annular recess 25b while the circular plate-like lens body 26a of the second resin lens 26 abuts on the inner circumferential surface of the annular recess 25b.

As described above, while the first press member 15 is installed in the rear end of the second barrel portion 11a2 of the first lens barrel 11 with the external thread member 15b being completely meshed with the internal thread member IT, the press projection 15c of the first press member 15 presses the rear-end wall 16b of the second lens barrel 16A toward the fourth glass lens 24, thus causing the front-end wall 16a of the second lens barrel 16 to press the outer periphery of the second optical concave surface 24b toward the third glass lens 23.

In the second lens barrel 16A, the second press member 19 is configured to press the first resin lens 25A toward the front-end wall 16a of the second lens barrel 16A to thereby fixedly hold the first resin lens 25A to the second lens barrel 16A. Note that, if the first resin lens 25A creeps or wobbles, the amount of wobbling of the first resin lens 25A would depend on the thickness of the pressed portion of the first resin lens 25A in the pressing direction, i.e. the optical axis direction of the lens module 10A. That is, the amount of wobbling of the first resin lens 25A would increase with an increase of the thickness of the pressed portion of the first resin lens 25A in the pressing direction.

From this viewpoint, the annular bottom of the annular outer groove 25e, which has a thickness smaller than the annular outer wall 25d of the first reins lens 25A, is configured to be pressed by the second press member 19. This configuration would reduce the amount of wobbling of the first resin lens 25A even if there were creeps in the first resin lens 25A.

Figure 8:
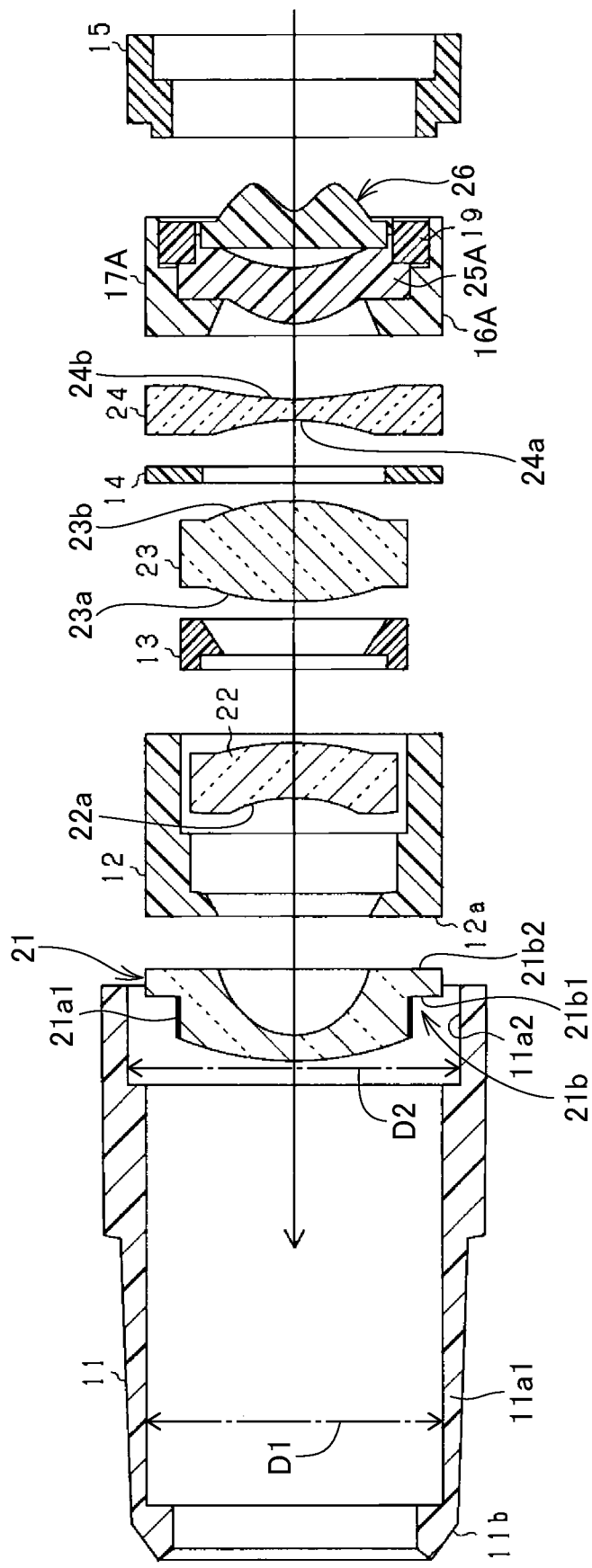
FIG. 8 is an exploded axial cross-sectional view schematically illustrating a situation where first to fourth glass lenses and a resin unit are inserted into a first lens barrel according to the second embodiment.

FIG. 8 is an exploded axial cross-sectional view schematically illustrating a situation where the first to fourth glass lenses 21 to 24 and the resin unit 17A including the first and second resin lenses 25A and 26 are inserted into the first lens barrel 11 via the opening of the rear end of the second barrel portion 11a2 of the first lens barrel 11 in this order. The procedure of installing the first to fourth glass lenses 21 to 24 and the resin unit 17A in the first lens barrel 11 according to the second embodiment is substantially identical to the procedure of installing the first to fourth glass lenses 21 to 24 and the resin unit 17A in the first lens barrel 11 according to the first embodiment. For this reason, descriptions of the procedure of installing the first to fourth glass lenses 21 to 24 and the resin unit 17A in the first lens barrel 11 according to the second embodiment are omitted.

As described above, the press projection 15c of the first press member 15 is configured to press the glass lenses 21 to 24 and the resin unit 17A in the first lens barrel 11 in the optical axis direction of the first lens barrel 11. For this reason, the pressing force by the press projection 15c, which will be referred to as F1, is set to a predetermined high value.

In contrast, because the second press member 19 is configured to press the first resin lens 25A in the second lens barrel 16 by pressing force F2 that is enough to fixedly hold the first and second resin lenses 25A and 26, which are lighter in weight than the glass lenses 21 to 24, to the second lens barrel 16A, the pressing force F2 can be set to be smaller than the pressing force F1.

That is, the above configuration of the lens module 10A makes it possible to maintain the magnitude of the pressing force F2 to a small value enough to prevent creep in the first resin lens 25A.

The lens module 10A configured set forth above obtains the following benefits.

The lens module 10A is configured to (1) Press, by the second press member 19, the first resin lens 25A integrated with the second resin lens 26 to the second lens barrel 16A to thereby fixedly hold the first resin lens 25A integrated with the second resin lens 26 to the second lens barrel 16A (2) Press, by the first press member 15, the first to fourth glass lenses 21 to 24 and the second lens barrel 16A to a part of the first lens barrel 11 to thereby fixedly hold the first to fourth glass lenses 21 to 24 in the first lens barrel 11

This configuration makes it possible to individually press the first to fourth glass lenses 21 to 24 using the first press member 15 for fixedly holding the glass lenses 21 to 24, and press the first and second resin lenses 25A and 26 for fixedly holding the resin lenses 25 and 26. This eliminates the need of pressing the resin lenses 25A and 26 using relatively strong pressing force, and maintains the magnitude of the pressing force F2 to a small value enough to prevent creep in the first resin lens 25A.

This configuration therefore enables the first type of lenses, i.e. the glass lenses 21 to 24, to be held in the first lens barrel 11 by first means of pressing force suitable for holding of the glass lenses 21 to 24, and the second type of lenses, such as the resin lenses 25 and 26, to be held in the first lens barrel 11 by second means of suitable for holding of the resin lenses 25 and 26. This therefore makes it possible to hold the first type of lenses 21 to 24 and the second type of lenses 25 and 26 without at least one of the first type of lenses 21 to 24 and the second type of lenses 25 and 26 wobbling.

If the first resin lens 25A creeps or wobbles, the amount of wobbling of the first resin lens 25A would depend on the thickness of the pressed portion of the first resin lens 25A in the pressing direction, i.e. the optical axis direction of the lens module 10A. That is, the amount of wobbling of the first resin lens 25A would increase with an increase of the thickness of the pressed portion of the first resin lens 25A in the pressing direction.

From this viewpoint, the annular bottom of the annular outer groove 25e, which has a thickness smaller than the annular outer wall 25d of the first reins lens 25A, is configured to be pressed by the second press member 19. This configuration would reduce the amount of wobbling of the first resin lens 25A even if the lens creeps in the first resin lens 25A.

Modifications

The present disclosure is not limited to the first and second embodiments set forth above, and can be variously modified. One of the following modifications can be applied to the lens module 10 of the first embodiment or the lens module 10A of the second embodiment, or the combination of at least two of the following modifications can be applied to the lens module 10 of the first embodiment or the lens module 10A of the second embodiment.

Figure 9:
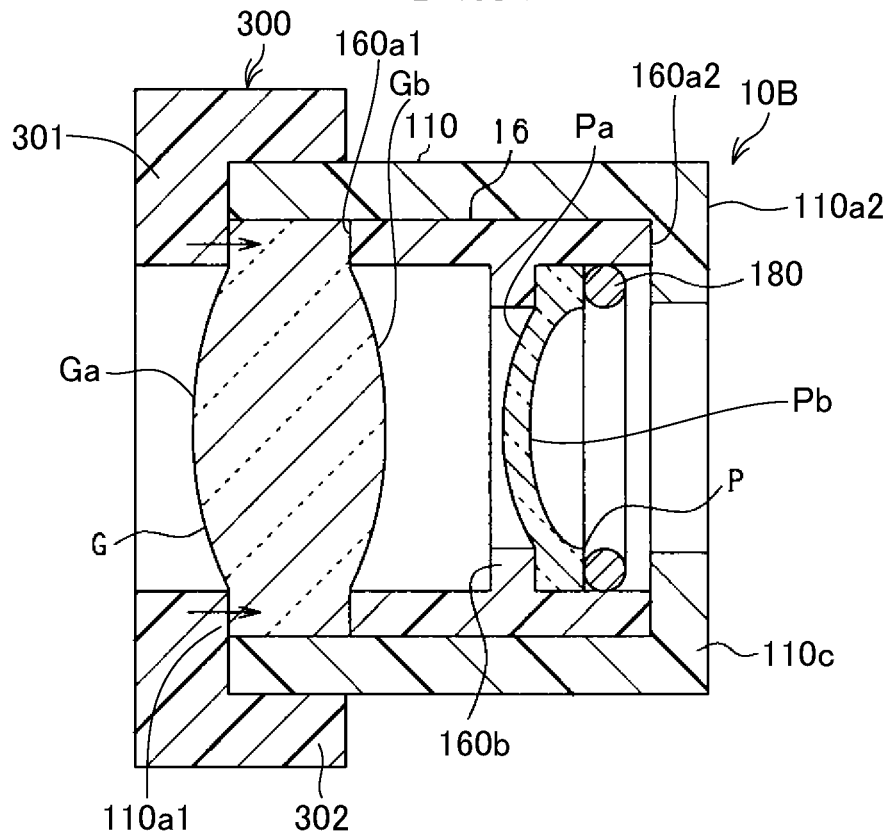
FIG. 9 is an axial cross-sectional view schematically illustrating a lens module according to the first modification of each of the first and second embodiments.

Referring to FIG. 9, a lens module 10B according to a first modification includes a lens unit 100a and a lens barrel assembly 100b for holding the lens unit 100a.

The lens unit 100a is comprised of a glass lens G designed as, for example, a biconvex lens, and a resin lens P designed as, for example, a convex meniscus lens.

The lens battery assembly 100b is comprised of a substantially hollow cylindrical or tubular first lens barrel 110 having opposing first and second end walls 110a1 and 110a2, and a substantially hollow cylindrical or tubular second lens barrel 160 having opposing first and second end walls 160*a*1 and 160*a*2. The first end wall 110*a*1, which is located to be closer to the front end of the vehicle than the second end wall 110*a*2 is, is an opening wall in which the glass lens G is filled in alignment with the first lens barrel 110.

The glass lens G has first and second major surfaces respectively corresponding to front and rear surfaces. Each of the first and second major surfaces has a corresponding one of optical convex surfaces 23*a* and 23*b* formed at the center thereof. The optical convex surfaces Ga and Gb respectively serve as effective aperture regions; the first optical convex surface Ga is convex toward the front end of the vehicle, and the second optical convex surface Gb is convex toward the rear direction of the vehicle.

The second end wall 110*a*2 of the first lens barrel 110 has an opening, and has formed an annular stopper 110*c* projecting inwardly from the inner periphery of the second end wall 110*a*2.

The second lens barrel 160 is coaxially installed in the first lens barrel 110 such that (1) The first end wall 160*a*1 abuts on the non-optical outer periphery of the second major surface of the glass lens G (2) The second end wall 160*a*2 abuts on the lens stopper 110*c* of the first lens barrel 110

The second lens barrel 160 includes an annular stopper 160*b* projecting from the inner surface of the second lens barrel 160.

The resin lens P has opposing first and second major surfaces; the first major surface, i.e. the front major surface, faces the glass lens G, and the second major surface, i.e. the rear major surface, faces the second end wall 110*a*2 of the first lens barrel 110. The first major surface of the resin lens P has, as an effective aperture region, a convex surface Pa formed at the center thereof.

The resin lens P is disposed in the second lens barrel 160 to be coaxial with the second lens barrel 160 such that the non-optical outer periphery of the first major surface abuts on the annular stopper 160*b*. The resin lens P is fixed to the second lens barrel 160 with an adhesive member 180.

The lens barrel 110B includes a front press member 300 having a substantially annular base 301 and a projection wall 302 projecting from an outer circumferential end of the base 301 toward the rear direction of the vehicle. The base 301 has an opening formed at the center thereof; the area and size of the opening corresponds to the area and size of the convex surface Ga. The front press member 300 is coaxially mounted to the first opening end wall 110*a*1 of the first lens barrel 110 such that an annular inner surface of the base 301 abuts on both the non-optical outer periphery of the first major surface Ga of the glass lens G, and the first end wall 110*a*1 of the first lens barrel 110, and presses the glass lens G and the first lens barrel 110 toward the rear end of the vehicle from the front side of the vehicle.

Similarly, in the second lens barrel 16A of the second embodiment, the second lens barrel 16A can include an annular stopper (see 160*b* in FIG. 9). The first resin lens 25A can include the annular outer groove 25*e* formed at the non-optical outer periphery of the first major surface of the first resin lens 25A. The first resin lens 25A can be arranged such that the second major surface abuts on the annular stopper 160*b*. A front press member, such as the first press member 15, can be configured to press the annular bottom of the annular outer groove 25*e* of the first resin lens 25A toward the rear direction of the vehicle.

Each of the holding mechanisms HM and HM1 can be configured such that the first press member 15 is threadably joined to the second barrel portion 11*a*2 to thereby press the second lens barrel 16, but the present disclosure is not limited thereto.

Specifically, each of the holding mechanisms HM and HM1 can be configured to perform swaging, i.e. heat swaging, of the rear end of the second barrel portion 11*a*2 to press the first press member 15 or the rear-end wall 16*b* of the second lens barrel 16 toward the front direction of the vehicle.

Figure 10:
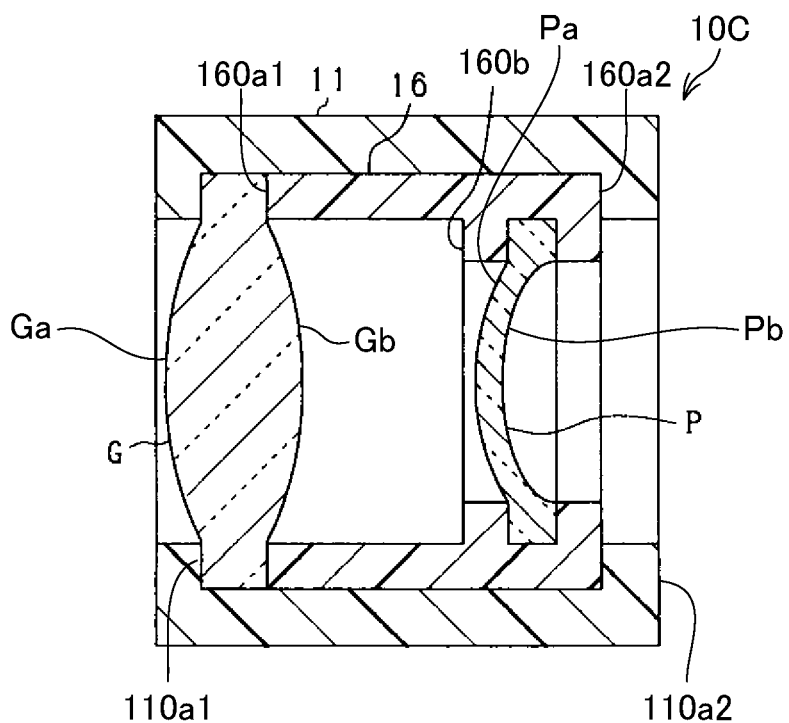
FIG. 10 is an axial cross-sectional view schematically illustrating a lens module according to the second modification of each of the first and second embodiments.

For example, the following describes how to perform the heat swaging with reference to FIG. 10.

Referring to FIG. 10, as compared with the lens module 10B illustrated in FIG. 9, a lens module 10C of a second modification is configured such that the front press member 300 and adhesive 100 have been eliminated from the lens module 10B.

In addition, the first end wall 110*a*1 of the first lens barrel 110 is thermally swaged inwardly to press the outer periphery of the glass lens G in the rear direction of the vehicle. The inwardly swaged end wall 110*a*1 serves as an annular latch member to latch the outer periphery of the first major surface of the glass lens G, thus pressing the outer periphery of the first major surface Ga of the glass lens G in the rear direction of the vehicle.

The second end wall 160*a*2 of the second lens barrel 160 is thermally swaged inwardly to press the outer periphery of the second major surface of the resin lens P in the front direction of the vehicle.

The second end wall 110*a*2 of the first lens barrel 110 is thermally swaged inwardly to press the swaged end wall 160*a*2 of the second lens barrel 160 in the front direction, thus pressing the outer periphery of the second major surface Gb of the glass lens G by the first end wall 160*a*1 of the second lens barrel 160. This results in the glass lens G being fixedly supported to the first lens barrel 110 and the second lens barrel 160.

Note that, for thermally swaging the first lens barrel 110 and the second lens barrel 160, each of the first lens barrel 110 and the second lens barrel 160 is preferably made of a metallic material. FIG. 10 schematically illustrates that both the first and second lens barrels 110 and 160 are thermally swaged, but any one of the first and second lens barrels 110 and 160 can be swaged.

For thermally swaging the front end wall of the first lens barrel 110 to thereby press the front end wall of the first lens barrel 110 in the rear direction of the vehicle, the glass lens G can be preferably configured such that the outer periphery of the glass lens G is supported by an annular stopper (see 160*b* in FIG. 10).

The functions of one element in each of the embodiments can be distributed as plural elements, and the functions that plural elements have can be combined into one element. At least part of the structure of each of the embodiments can be replaced with a known structure having the same function as the at least part of the structure of the corresponding embodiment. A part of the structure of each of the embodiments can be eliminated. At least part of the structure of each of the embodiments can be added to or replaced with at least part of the structure of other embodiments.

All aspects included in the technological ideas specified by the language employed by the claims constitute embodiments of the present disclosure.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A lens module comprising:
    a first lens barrel having a first end and a second end that opposes the first end along an optical axis;
    at least one glass lens disposed in the first lens barrel;
    at least one resin lens disposed in the first lens barrel and arranged to be closer to the second end than the at least one glass lens is;
    a second lens barrel disposed in the first lens barrel to surround the at least one resin lens, the second lens barrel having a first end and a second end that opposes the first end, which respectively correspond to the first and second ends of the first lens barrel; and
    a holding mechanism configured to:
        apply a pressing force to the at least one glass lens and the second lens barrel in a direction of the optical axis to perform pressure holding of the at least one glass lens and the second lens barrel in a direction of the optical axis; and
        hold the at least one resin lens while preventing the pressing force from being directly applied to the at least one resin lens,
    wherein;
        the holding mechanism comprises one of a first configuration and a second configuration;
        the first configuration comprised of a portion of the holding mechanism being threadably joined to the second end of the first lens barrel to thereby press the second end of the second lens barrel parallel to the optical axis; and
        the second configuration comprised of the second end of the first lens barrel being thermally swaged to the second end of the second lens barrel, a swaged second end of the first lens barrel presses the second end of the second lens barrel parallel to the optical axis.

2. The lens module according to claim 1, wherein:
    the holding mechanism comprises:
        a press member configured to press the second lens barrel in the optical axis using the pressing force to press the at least one glass lens via the second lens barrel, thus holding the second lens barrel and the at least one glass lens; and
        an adhesive member configured to adhere the at least one resin lens to the second lens barrel.

3. The lens module according to claim 2, wherein:
    the press member is located to abut on the second lens barrel; and
    the holding mechanism is configured to cause the press member to press the second lens barrel parallel to the optical axis while the press member abuts on the second lens barrel.

4. The lens module according to claim 3, wherein:
    the first end of the second lens barrel is directly or indirectly joined to the at least one glass lens, and the second end of the second lens barrel is arranged to abut on the press member; and
    the holding mechanism is configured to cause the press member to press the second end of the second lens barrel parallel to the optical axis so that the second lens barrel presses the at least one glass lens parallel to the optical axis.

5. The lens module according to claim 1, wherein:
    the at least one resin lens comprises a plurality of resin lenses the plurality of resin lenses comprise:
        at least one convex resin lens having a positive focal point; and
        at least one concave resin lens having a negative focal point.

6. The lens module according to claim 1, wherein:
    each of the second lens barrel and the at least one resin lens has an elastic modulus; and
    the elastic modulus of the second lens barrel is larger than the elastic modulus of the at least one resin lens.

7. A vehicular imaging device comprising:
    a lens module according to claim 1; and
    an image sensor comprising a light receiving area, the lens module being configured to focus light incident into the first lens barrel on the light receiving area, the image sensor being configured to receive the light focused on the light receiving area as an image.

8. A lens module comprising:
    a first lens barrel having a first end and a second end that opposes the first end along an optical axis;
    at least one glass lens disposed in the first lens barrel;
    at least one resin lens disposed in the first lens barrel and arranged to be closer to the second end than the at least one glass lens is;
    a second lens barrel disposed in the first lens barrel to surround the at least one resin lens the second lens barrel having a first end and a second end that opposes the first end, which respectively correspond to the first and second ends of the first lens barrel; and
    a holding mechanism comprising:
        a first press member configured to press the second lens barrel and the at least one glass lens in a direction of the optical axis, thus performing pressure holding of the at least one glass lens and the second lens barrel; and
        a second press member configured to press the at least one resin lens in the second lens barrel parallel to the optical axis, thus performing pressure holding of the at least one resin lens,
    wherein;
        the holding mechanism comprises one of a first configuration and a second configuration;
        the first configuration comprised of the first press member being threadably joined to the second end of the first lens barrel to thereby press the second end of the second lens barrel parallel to the optical axis; and
        the second configuration comprised of the second end of the first lens barrel being thermally swaged to the second end of the second lens barrel, a swaged second end of the first lens barrel serving as the first press member to press the second end of the second lens barrel parallel to the optical axis.

9. The lens module according to claim 8, wherein:
    the at least one resin lens has an optical portion and a non-optical outer periphery around the optical portion;
    the non-optical outer periphery includes a first peripheral portion having a predetermined first thickness in the direction of the optical axis and a second peripheral portion having a predetermined second thickness in the direction of the optical axis, the second thickness being smaller than the first thickness; and the second press member is configured to press the second peripheral portion of the at least one resin lens in the second lens barrel parallel to the optical axis, thus holding the at least one resin lens.

10. The lens module according to claim 8, wherein:
the holding mechanism is configured to cause the second press member to press the at least one resin lens to thereby cause the at least one resin lens to press the second lens barrel.

11. The lens module according to claim 8, wherein:
the first press member is located to abut on the second lens barrel; and
the holding mechanism is configured to cause the first press member to press the second lens barrel parallel to the optical axis while the first press member abuts on the second lens barrel.

12. The lens module according to claim 11, wherein:
the first end of the second lens barrel is directly or indirectly joined to the at least one glass lens, and the second end of the second lens barrel is arranged to abut on the first press member; and
the holding mechanism is configured to cause the first press member to press the second end of the second lens barrel parallel to the optical axis so that the second lens barrel presses the at least one glass lens parallel to the optical axis.

13. The lens module according to claim 8, wherein:
the at least one resin lens comprises a plurality of resin lenses the plurality of resin lenses comprise:
at least one convex resin lens having a positive focal point; and
at least one concave resin lens having a negative focal point.

14. The lens module according to claim 8, wherein:
each of the second lens barrel and the at least one resin lens has an elastic modulus; and
the elastic modulus of the second lens barrel is larger than the elastic modulus of the at least one resin lens.

15. A vehicular imaging device comprising:
a lens module according to claim 8; and
an image sensor comprising a light receiving area, the lens module being configured to focus light incident into the first lens barrel on the light receiving area, the image sensor being configured to receive the light focused on the light receiving area as an image.

* * * * *